United States Patent [19]

Yoshizawa et al.

[11] Patent Number: 5,308,374
[45] Date of Patent: May 3, 1994

[54] METHOD OF MANUFACTURING ZINC-ALKALINE BATTERIES

[75] Inventors: Hiroshi Yoshizawa; Akira Miura, both of Katano; Yoshiaki Nitta, Osaka; Sachiko Sugihara, Katano, all of Japan

[73] Assignee: Matsushita Electric Industrial Co., Ltd., Osaka, Japan

[21] Appl. No.: 18,433

[22] Filed: Feb. 16, 1993

[30] Foreign Application Priority Data

Feb. 26, 1992 [JP] Japan .................. 4-039081

[51] Int. Cl.⁵ .................. H01M 4/42; H01M 10/24
[52] U.S. Cl. .................. 29/623.1; 429/206; 429/229
[58] Field of Search ........... 429/206, 200, 229, 231; 29/623.1

[56] References Cited

FOREIGN PATENT DOCUMENTS

| | | |
|---|---|---|
| 0377106A1 | 7/1990 | European Pat. Off. |
| 0457354A1 | 11/1991 | |
| 0518659A2 | 12/1992 | European Pat. Off. |
| 518659 | 12/1992 | European Pat. Off. |
| 2634594 | 1/1990 | France |
| 48-53227 | 7/1973 | Japan |
| 1-105466 | 4/1989 | Japan |

Primary Examiner—John S. Maples
Attorney, Agent, or Firm—Stevens, Davis, Miller & Mosher

[57] ABSTRACT

A non-pollution zinc-alkaline battery excellent in storage stability can be obtained by using, in formulation for negative electrode, a zinc alloy which contains at least one element selected from the group consisting of bismuth, lithium, calcium and aluminum which is free from mercury, lead, cadmium, indium and thallium is used as an active material and gallium hydroxide or gallium oxide optimized in a starting material therefor, particle size and weight loss on heat decomposition as an inorganic inhibitor. The storage stability of the battery can be further improved by adding to the above formulation for a negative electrode a proper amount of a surfactant having a polyethylene oxide group in a hydrophilic group and a perfluoroalkyl group in oleophilic group as an organic inhibitor.

20 Claims, 1 Drawing Sheet

METHOD OF MANUFACTURING ZINC-ALKALINE BATTERIES

BACKGROUND OF THE INVENTION

1. Field of the Invention

The present invention relates to a technique to manufacture, without using mercury, lead and indium, zinc-alkaline batteries which use zinc as a negative electrode active material, an aqueous alkali solution as an electrolyte and manganese dioxide, silver oxide, oxygen and the like as a positive electrode active material and provides a method of manufacturing zinc-alkaline batteries which do not cause environmental pollution and are excellent in storage stability and dischargeability.

2. Description of Related Art

Since about 10 years ago, environmental pollution due to mercury of waste batteries has become a serious problem and there have been conducted researches for reducing the amount of mercury used in alkaline dry batteries. As a result, corrosion-resistant zinc alloys and inhibitors have been developed and at present, the amount of mercury contained in alkaline dry batteries has been able to be reduced to 250 ppm based on the weight of the battery and furthermore, mercury-free alkaline dry batteries have also been put on the market.

An attempt for manufacturing alkaline dry batteries without mercury has been made since mercury-containing alkaline dry batteries were developed and a number of patent applications and reports were made on corrosion-resistant zinc alloys and inorganic and organic inhibitors. For example, elements such as indium, lead, cadmium and thallium are known as materials having a high hydrogen overvoltage and these elements are used as additive elements for corrosion-resistant zinc alloys and furthermore, compounds (salts, oxides, hydroxides) of these elements are used as inhibitors (Japanese Patent Kokai (Laid-Open) No.1-105466).

Batteries in which pure zinc free from mercury is used as a negative electrode active material suffer from the problems that a vigorous corrosion reaction of zinc takes place with the generation of hydrogen and internal pressure of the batteries increases to expel the electrolyte and to deteriorate the resistance to leakage of electrolyte. Further, in the case of partially discharged batteries, the hydrogen generation rate at the zinc negative electrode increases and the resistance to leakage of electrolyte is further deteriorated. These problems are caused by the fact that mercury which inhibits the corrosion reaction by enhancing the hydrogen overvoltage at the surface of zinc has been exhausted. As mentioned above, for manufacturing alkaline dry batteries without mercury, indium, lead, cadmium, thallium and the like are used as additive elements for corrosion-resistant zinc alloys and compounds of these elements are used as inhibitors.

Among these indium, lead, cadmium and thallium, lead, cadmium and thallium are pollution materials like mercury and it is not desired to use these elements as additive elements even in a slight amount for preventing environmental pollution caused by batteries. Since indium is generally not regarded as harmful material and is high in corrosion preventing ability, it is known as an additive to a negative electrode of not only primary batteries, but also secondary batteries. In fact, indium is used in formulation of mercury-free alkaline batteries not only as an additive element for alloys, but also as an inorganic inhibitor to be added to alkaline electrolytes. However, chronic poisoning of indium has not yet been elucidated and the U.S. Academic Council for Industrial Hygiene (ACGIH) has prescribed the permissible concentration more severely than for lead.

The object of the present invention is to provide non-pollution alkaline dry cells by inhibiting corrosion of zinc without using indium, lead, cadmium and thallium as well as mercury.

SUMMARY OF THE INVENTION

First, the present invention will be explained on the use of a corrosion-resistant zinc alloy and an inorganic inhibitor in combination. The zinc negative electrode part in the zinc-alkaline batteries of the present invention comprises a corrosion-resistant zinc alloy powder containing 0.01–0.5 wt % of bismuth or a corrosion-resistant zinc alloy powder containing 0.01–0.5 wt % of bismuth and 0.005–0.2 wt % of one or more of lithium, calcium and aluminum and is used as an active material and an alkaline electrolyte in which a gallium hydroxide or gallium oxide powder having proper properties is dispersed at a proper concentration.

Next, the present invention will be explained on the use of a zinc alloy, an inorganic inhibitor and an organic inhibitor in combination. The zinc negative electrode part in the zinc-alkaline batteries of the present invention comprises a corrosion-resistant zinc alloy powder containing 0.01–0.5 wt % of bismuth or a corrosion-resistant zinc alloy powder containing 0.01–0.5 wt % of bismuth and 0.005–0.2 wt % of one or more of lithium, calcium and aluminum and is used as an active material and an alkaline electrolyte in which a proper concentration of a gallium hydroxide or gallium oxide powder having proper properties is dispersed and which additionally contains a proper amount of a so-called perfluoroalkyl polyethylene oxide surfactant having polyethylene oxide in a hydrophilic group and a perfluoroalkyl group in an oleophilic group as an organic inhibitor.

The perfluoroalkyl polyethylene oxide surfactant has its effect when contained in an amount of 0.001–0.1 wt % based on the zinc alloy in the alkaline electrolyte.

Furthermore, from the point of a method for manufacture of batteries, the gallium hydroxide used is preferably one which is synthesized by neutralization treatment of an aqueous solution of gallium chloride, gallium sulfate or gallium nitrate as a starting material. Use of gallium chloride as the starting material gives a higher corrosion resistance than use of gallium sulfate. When gallium sulfate or gallium nitrate is used as the starting material, it is preferred to synthesize gallium hydroxide by neutralization treatment of an aqueous solution containing chloride ion.

Furthermore, gallium hydroxide or oxide preferably comprises powders containing at least 60 wt %, preferably at least 70 wt % of particles having a particle size of 0.5–8$\mu$ based on the total amount of the powders.

Furthermore, gallium hydroxide is effective since it shows a loss in weight of 8–25 wt % upon heat decomposition at a temperature of up to 900° C.

The corrosion-resistant zinc alloy, inorganic inhibitor and organic inhibitor used in the present invention, combinations and compositions of them have been found as a result of intensive researches made so that each of them can provide the maximum effect of the combination use. The action of each of the materials has not yet been elucidated, but can be considered as follows.

The advantageous effect obtained by each of the additive elements in the alloy, inorganic inhibitor and organic inhibitor is explained below.

Bismuth as an element in the alloy has itself a high hydrogen overvoltage and, when added to zinc, has an action to increase the hydrogen overvoltage on the surface of zinc. When bismuth is uniformly added to the alloy, it is present at any depths of the powder and, therefore, the above-mentioned action is retained even when a fresh surface of zinc appears under discharge. Lithium, calcium and aluminum have an action to spheroidize the zinc particles and reduce the true specific surface area and thus decrease corrosion of the zinc powder per unit weight.

When gallium hydroxide or gallium oxide in a powdery form is dispersed in an alkaline electrolyte together with the zinc alloy, a part of the oxide is dissolved and specifically adsorbed to the surface of the zinc alloy as gallium ion to increase the hydrogen overvoltage on the surface. The other part remains as solid in the electrolyte and when a fresh surface of zinc alloy appears under discharge, it is specifically adsorbed to the fresh surface to provide the corrosion preventing effect.

When the surfactant coexists with the zinc alloy in a gel-like alkaline electrolyte, it is chemically adsorbed to the surface of the zinc alloy on the principle of metallic soap and forms a hydrophobic monomolecular layer to provide the corrosion preventing effect. Especially, the surfactant having polyethylene oxide group in its hydrophilic group is high in solubility as a micelle in the alkaline electrolyte and, when introduced into the electrolyte, it is rapidly transferred and adsorbed to the surface of the zinc alloy to provide a high corrosion preventing effect. Moreover, when the surfactant has a perfluoroalkyl group in its oleophilic group and is adsorbed to the surface of the zinc alloy, since it has a high electric insulation, donation and acceptance of electron in corrosion reaction are effectively hindered and this effect is sustained because of its high alkali resistance.

Next, the effect obtained by the combination use of the zinc alloy and gallium hydroxide or gallium oxide will be explained. Gallium oxide and gallium hydroxide dissolve in the electrolyte as gallium ion and are specifically adsorbed to the surface of the zinc alloy to perform its action. Therefore, the adsorption must take place smoothly and uniformly for providing its effect. Since a considerable amount of hydrogen gas is generated over the zinc surface having no corrosion resistance, adsorption of gallium ions to the surface is hindered and the state of the adsorption becomes uneven. However, generation of hydrogen gas is inhibited on the surface of the zinc alloy having a good corrosion resistance and the adsorption is smoothly and uniformly carried out to provide the synergistic effect.

With reference to the effects obtained by the combination use of the zinc alloy, surfactant and gallium hydroxide or gallium oxide, it is considered that, as mentioned above, when a zinc alloy and surfactant are present together, generation of hydrogen gas on the surface of the zinc alloy is further inhibited and adsorption of gallium ions is carried out smoothly and uniformly to provide the synergistic effect.

BRIEF DESCRIPTION OF THE DRAWING

In FIG. 1, 1 indicates a positive electrode depolarizing mix, 2 a gel-like negative electrode of the present invention, 3 a separator, 4 a current collector of the gel-like negative electrode, 5 a positive electrode terminal cap, 6 a metallic case, 7 an outer can of battery, 8 a polyethylene resin sealer for stopping the opening of the case 6, and 9 a bottom plate which serves as a terminal of the negative electrode.

DESCRIPTION OF THE PREFERRED EMBODIMENTS

Figure 1:
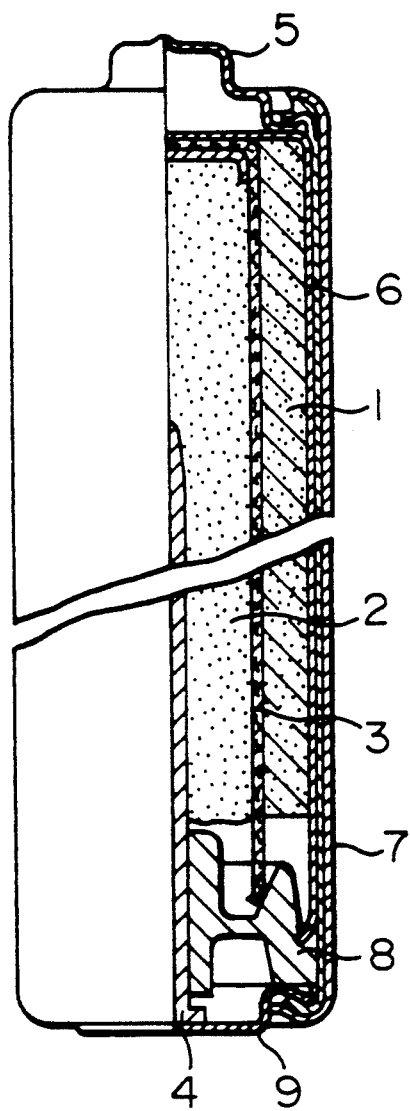
FIG. 1 is a structural cross-sectional view of an alkaline manganese battery, LR6, used in the example of the present invention.

The details and effects of the present invention will be explained by the following examples.

First, explanation will be made on a method of preparation of the corrosion-resistant zinc alloy, a method of preparation of the gallium hydroxide and gallium oxide and a method for comparative evaluation of the leakage resistance using an LR6 alkaline manganese battery.

The corrosion-resistant zinc alloy powder was prepared by a so-called atomizing method which comprises melting zinc of 99.97% in purity, adding thereto a given additive element in a given amount, uniformly dissolving the element and then powdering the melt by atomization with a compressed air. The resulting powder was classified by a screen to obtain a powder of 45–150 mesh in particle size.

The gallium hydroxide was prepared in the following manner. A given gallium salt in a saturation amount was added to an acidic aqueous solution of pH=1 and this aqueous solution was neutralized by adding thereto ammonia gas as a neutralizing agent until pH of the aqueous solution reached 9 under stirring by a screw stirrer. Thereafter, the precipitate was washed with deionized water on a filter having a mesh of $0.5\mu$ until pH of the filtrate reached 7.5 and the precipitate on the filter was subjected to suction from below the filter under vacuum to remove water and was vacuum dried at 60° C. to obtain the gallium hydroxide. The gallium oxide was prepared by subjecting the gallium hydroxide to heat decompositon at 900° C.

The gel-like negative electrode was prepared in the following manner. To 40 wt % of an aqueous potassium hydroxide solution (containing 3 wt % of ZnO) were added 3 wt % of sodium polyacrylate and 1 wt % of carboxymethylcellulose to form a gel. Then, a given amount of the gallium hydroxide or gallium oxide powder was gradually added to the resulting gel-like electrolyte under stirring, followed by aging for 2–3 hours. To this gel-like electrolyte was further added the zinc alloy powder in an amount twice the weight of the electrolyte, followed by mixing them. If the surfactant is used, a step of adding it in a given amount, stirring and aging for 2–3 hours was inserted before addition of the inorganic inhibitor.

Evaluation of the resistance to leakage of electrolyte was conducted in the following manner. One hundred alkaline manganese batteries as shown in FIG. 1 were made on an experimental basis and subjected to partial discharge to a depth of 20% of a theoretical capacity at a constant current of 1A which is the severest condition for an LR6 type battery and stored for a given period of time at 60° C. The number of batteries in which leakage of the electrolyte occurred was taken as leakage index (%), by which the resistance to leakage was evaluated. When the batteries show a leakage index of 0% after stored for 30 days at 60° C. under the above severe conditions, these batteries are practically usable, but it is desired that the performances relating to reliability of the resistance to leakage can be maintained as long as possible.

EXAMPLE 1

The proper amount of the inorganic inhibitor when the zinc alloy and the inorganic inhibitor are used in combination will be shown.

Table 1 shows the results of the leakage test on batteries in which a zinc alloy containing 0.05 wt % of bismuth, a zinc alloy containing 0.05 wt % of bismuth and 0.02 wt % of lithium, a zinc alloy containing 0.05 wt % of bismuth and 0.02 wt % of calcium or a zinc alloy containing 0.05 wt % of bismuth and 0.02 wt % of aluminum to which 0.001-1 wt % of gallium hydroxide was added was used for negative electrode and which were stored for 30 days at 60° C. In this connection, the zinc alloys used are those which have the highest corrosion Resistance among the alloys which do not contain mercury, lead, cadmium, indium and thallium. The gallium hydroxide used was a gallium hydroxide powder which was prepared using a sulfate as a starting material, contained 70 wt % of particles having a particle size of 0.5–8μ and was 15% in weight loss on heat decomposition at a temperature of up to 900° C.

TABLE 1

Influence of the amount of gallium hydroxide when zinc alloy and gallium hydroxide were used in combination

| | | | | No inhibitor added (Comparative Example) | Leakage index (%) after stored for 30 days at 60° C. | | | | | | |
|---|---|---|---|---|---|---|---|---|---|---|---|
| Additive elements and compositions (wt %) | | | | | Amount of gallium hydroxide (wt % based on zinc alloy) | | | | | | |
| No. | Bi | Li | Ca | Al | 0 | 0.001 | 0.005 | 0.01 | 0.05 | 0.1 | 0.5 | 1.0 |
| 1 | 0.05 | 0 | 0 | 0 | 56 | 29 | 0 | 0 | 0 | 0 | 0 | 23 |
| 2 | 0.05 | 0.02 | 0 | 0 | 47 | 33 | 0 | 0 | 0 | 0 | 0 | 26 |
| 3 | 0.05 | 0 | 0.02 | 0 | 48 | 29 | 0 | 0 | 0 | 0 | 0 | 24 |
| 4 | 0.05 | 0 | 0 | 0.02 | 45 | 27 | 0 | 0 | 0 | 0 | 0 | 25 |

From Table 1, it can be seen that the zinc alloy excellent in corrosion resistance cannot practically secure any acceptable resistance to leakage when it is used alone, but the resistance to leakage can be secured by adding to the alloy a proper amount of the gallium hydroxide. Good results were obtained when the gallium hydroxide was added in an amount of 0.005–0.5 wt % for the respective zinc alloys. When gallium oxide was used in place of the gallium hydroxide, the leakage index of the batteries was 0% during storage for 20 days at 60° C. with an amount in the range of 0.005–0.5 wt %, and thus, there was obtained a higher storage stability than when the alloy was used alone.

EXAMPLE 2

The proper alloy composition when the zinc alloy and the inorganic inhibitor are used in combination will be shown.

Table 2 shows the results of the leakage test on the batteries which were made with fixing the amount of gallium hydroxide at 0.1 wt % and changing the amount of bismuth which was singly added to the zinc alloy and stored for 30 days at 60° C.

From Table 2, it can be seen that satisfactory results can be obtained when bismuth is added in an amount of 0.01–0.5 wt % based on zinc.

TABLE 2

Influence of the alloy composition when zinc alloy and gallium hydroxide were used in combination

| Additive elements and compositions | | Leakage index (%) after storage for 30 days at 60° C. Amount of gallium hydroxide |
|---|---|---|
| No. | Bi | 0.1 (wt % based on zinc alloy) |
| 5 | 0.005 | 31 |
| 6 | 0.01 | 0 |
| 7 | 0.5 | 0 |
| 8 | 1.0 | 18 |

Table 3 shows the results of the leakage test on the batteries which were made with fixing the amount of gallium hydroxide at 0.1 wt % and changing the amounts of lithium, calcium and aluminum in the zinc alloy containing bismuth, lithium, calcium and aluminum and stored for 45 days at 60° C.

TABLE 3

Influence of the alloy composition when zinc alloy and gallium hydroxide were used in combination

| Additive elements and compositions (wt %) | | | | Leakage index (%) after storage for 45 days at 60° C. Amount of gallium hydroxide 0.1 (wt % based on zinc alloy) |
|---|---|---|---|---|
| No. | Bi | Li | Ca | Al | |
| 9 | 0.05 | 0.001 | 0 | 0 | 24 |
| 10 | 0.05 | 0.005 | 0 | 0 | 0 |
| 11 | 0.05 | 0.01 | 0 | 0 | 0 |
| 12 | 0.05 | 0.2 | 0 | 0 | 0 |
| 13 | 0.05 | 0.5 | 0 | 0 | 17 |
| 14 | 0.05 | 0 | 0.005 | 0 | 0 |
| 15 | 0.05 | 0 | 0.01 | 0 | 0 |
| 16 | 0.05 | 0 | 0.2 | 0 | 0 |
| 17 | 0.05 | 0 | 0 | 0.005 | 0 |
| 18 | 0.05 | 0 | 0 | 0.01 | 0 |
| 19 | 0.05 | 0 | 0 | 0.2 | 0 |
| 20 | 0.05 | 0.002 | 0.002 | 0.001 | 0 |
| 21 | 0.05 | 0.05 | 0.05 | 0.1 | 0 |

From Table 3, it can be seen that good results can be obtained when the amounts of lithium, calcium and aluminum are totally in the range of 0.005–0.2 wt % based on zinc. The gallium hydroxide used in Example 2 was the same as used in Example 1. When gallium oxide was used in place of the gallium hydroxide, the leakage index of the batteries was 0% during storage for 20 days at 60° C. with the same alloy compositions as above and thus, there was obtained a higher storage stability than when the alloy was used alone.

EXAMPLE 3

The present invention will be explained regarding limitation of the starting materials in preparation of gallium hydroxide.

Table 4 shows the results of the leakage test on the batteries which were made using 0.1 wt % of gallium hydroxide different in the starting material and stored for 30 days at 60° C.

From Table 4, it can be seen that the batteries made using gallium hydroxide prepared from chloride or sulfate as a starting material are superior in leakage resistance. It is further seen that even when a nitrate is used as the starting material, the resulting batteries are superior if gallium hydroxide is prepared in the presence of chloride ion. When gallium oxide was used in place of the gallium hydroxide, the batteries showed a leakage index of 0% during storage for 20 days at 60° C. and thus, there was obtained a higher storage stability than when the alloy was used alone.

TABLE 4

Influence of conditions for preparation of gallium hydroxide when zinc alloy and gallium hydroxide were used in combination.

| | Additive elements and compositions (wt %) | | | | Leakage index (%) after storage for 30 days at 60° C. Amount of gallium hydroxide 0.1 (wt % based on zinc alloy) Starting material and conditions for preparation | | | | |
|---|---|---|---|---|---|---|---|---|---|
| No. | Bi | Li | Ca | Al | Nitrate | Chloride | Sulfate | Sulfate + Chloride ion | Nitrate + Chloride ion |
| 22 | 0.05 | 0 | 0 | 0 | 18 | 0 | 0 | 0 | 0 |
| 23 | 0.05 | 0.02 | 0 | 0 | 17 | 0 | 0 | 0 | 0 |
| 24 | 0.05 | 0 | 0.02 | 0 | 19 | 0 | 0 | 0 | 0 |
| 25 | 0.05 | 0 | 0 | 0.02 | 21 | 0 | 0 | 0 | 0 |

EXAMPLE 4

Explanation will be made on the limitation of particle size of gallium hydroxide.

Table 5 shows the results of the leakage test on the batteries which were made using 0.1 wt % of gallium hydroxide different in the particle size distribution and which were stored for 30 days at 60° C.

It can be seen from Table 5 that superior results are obtained when a gallium hydroxide powder containing at least 60 wt % of particles having a particle size in the range of $0.5\text{-}8\mu$ (the remainder of the particles had a particle size of more than $0.5\mu$ since particles which remained on a filter having a mesh of $0.5\mu$ at the step of water washing in preparation of gallium hydroxide) is used. When the gallium hydroxide powder contained more than 70 wt % of the particles having the above-mentioned particle size, the batteries sometimes showed no leakage even after elapse of 45 days at 60° C.

The gallium hydroxide different in particle size distribution used in this Example was prepared by using a nitrate as a starting material and by subjecting particles of a large particle size to classification by a wet sedimentation method. When gallium oxide was used in place of the gallium hydroxide, the batteries showed a leakage index of 0% during storage for 20 days at 60° C. and thus, there was obtained a higher storage stability than when the alloy was used alone.

TABLE 5

Influence of particle size of gallium hydroxide when zinc alloy and gallium hydroxide were used in combination.

| | Additive elements and compositions (wt %) | | | | Leakage index (%) after storage for 30 days at 60° C. Amount of gallium hydroxide 0.1 (wt % based on zinc alloy) Amount of particles having a particle size of $0.5\text{-}8\mu$ (wt %) | | | |
|---|---|---|---|---|---|---|---|---|
| No. | Bi | Li | Ca | Al | 40 | 60 | 70 | 80 |
| 26 | 0.05 | 0 | 0 | 0 | 21 | 0 | 0 | 0 |
| 27 | 0.05 | 0.02 | 0 | 0 | 22 | 0 | 0 | 0 |
| 28 | 0.05 | 0 | 0.02 | 0 | 15 | 0 | 0 | 0 |
| 29 | 0.05 | 0 | 0 | 0.02 | 14 | 0 | 0 | 0 |

EXAMPLE 5

Explanation will be made on limitation of the weight loss of gallium hydroxide upon heat decomposition.

Table 6 shows the results of the leakage test on the batteries which were made using 0.1 wt % of gallium hydroxide different in weight loss on heat decomposition at up to 900° C. and which were stored for 30 days at 60° C.

It is seen from Table 6 that superior results can be obtained when gallium hydroxide having a weight loss on heat decomposition of 8-25 wt % is used.

The gallium hydroxide different in weight loss on heat decomposition used in this Example was prepared by using a chloride as a starting material and by subjecting it to neutralizing treatment and changing the vacuum drying time.

TABLE 6

Influence of weight loss of gallium hydroxide on heat decomposition when zinc alloy and gallium hydroxide were used in combination.

| | Additive elements and compositions (wt %) | | | | Leakage index (%) after storage for 30 days at 60° C. Amount of gallium hydroxide 0.1 (wt % based on zinc alloy) Weight loss of gallium hydroxide on heat decomposition (wt %) | | | | | | |
|---|---|---|---|---|---|---|---|---|---|---|---|
| No. | Bi | Li | Ca | Al | 5 | 8 | 10 | 15 | 20 | 25 | 30 |
| 31 | 0.05 | 0 | 0 | 0 | 5 | 0 | 0 | 0 | 0 | 0 | 8 |
| 32 | 0.05 | 0.02 | 0 | 0 | 7 | 0 | 0 | 0 | 0 | 0 | 9 |
| 33 | 0.05 | 0 | 0.02 | 0 | 7 | 0 | 0 | 0 | 0 | 0 | 7 |
| 34 | 0.05 | 0 | 0 | 0.02 | 6 | 0 | 0 | 0 | 0 | 0 | 7 |

EXAMPLE 6

The proper amount of an organic inhibitor added in using a zinc alloy, an inorganic inhibitor and the organic inhibitor in combination is shown in this Example.

Table 7 shows the results of the leakage test on the batteries which were made with fixing the amount of gallium hydroxide at the optimum of 0.1 wt % for the zinc alloy and changing the amount of the surfactant and stored for 60 days at 60° C.

From the results, it is seen that the proper amount of the organic inhibitor is 0.001–0.1 wt % based on the zinc alloy.

TABLE 7

Influence of the amount of the surfactant when a zinc alloy, gallium hydroxide and a surfactant were used in combination.

| | Additive elements and compositions (wt %) | | | | Leakage index (%) after storage for 30 days at 60° C. Amount of gallium hydroxide 0.1 (wt % based on zinc alloy) Amount of surfactant (wt % based on zinc alloy) | | | | | | |
|---|---|---|---|---|---|---|---|---|---|---|---|
| No. | Bi | Li | Ca | Al | 0.0005 | 0.001 | 0.005 | 0.01 | 0.05 | 0.1 | 0.2 |
| 35 | 0.05 | 0 | 0 | 0 | 19 | 0 | 0 | 0 | 0 | 0 | 21 |
| 36 | 0.05 | 0.02 | 0 | 0 | 30 | 0 | 0 | 0 | 0 | 0 | 14 |
| 37 | 0.05 | 0 | 0.02 | 0 | 12 | 0 | 0 | 0 | 0 | 0 | 34 |
| 38 | 0.05 | 0 | 0 | 0.02 | 16 | 0 | 0 | 0 | 0 | 0 | 21 |

The surfactant used in Example 6 had the following formula:

$$(X)-C_nF_{2n}-(Y)-(CH_2CH_2O)_m-(Z)$$

X: —F
Y: —C$_2$H$_4$—O—CH$_2$CH(OH)—CH$_2$—O—
Z: —CH$_3$.
n: 9, m: 45

When a surfactant having the following formula is used, the same or higher effect can be obtained.

$$(X)-C_nF_{2n}-(Y)-(CH_2CH_2O)_m-(Z)$$

X: —H or —F
Y: —C$_2$H$_4$—O—CH$_2$CH(OH)—CH$_2$—O—
Z: —CH$_3$, —PO$_3$W$_2$ or
 —SO$_3$W {W: alkali metal}
n: 4–14 m: 20–100

Phosphate type surfactants among the above surfactants may be mixtures of primary and secondary phosphates.

Gallium hydroxide used in Example 6 was the same as used in Example 1. When the suitable gallium hydroxide or gallium oxide shown in Examples 1, 2, 3, 4 and 5 is used, there can be obtained batteries having a sufficient storage stability. Furthermore, the same thing can also be applied to the alloy compositions.

As explained above, according to the present invention, unexpectedly higher synergistic effects can be obtained in zinc-alkaline batteries by adding to the alkaline electrolyte a zinc alloy having a proper composition and gallium hydroxide or gallium oxide which is imparted with proper properties by employing a proper process for the preparation thereof and increase of the internal pressure of the batteries caused by corrosion of zinc can be inhibited without using mercury, lead and indium and thus, the leakage resistance of the batteries can be improved.

Furthermore, by adding an organic inhibitor having a proper structural formula in a proper amount, there can be provided non-pollution zinc-alkaline batteries superior in storage stability.

What is claimed is:

1. A method of manufacturing a zinc-alkaline battery where a zinc alloy which contains at least one element selected from the group consisting of bismuth, lithium, calcium and aluminum and which is free from mercury, lead, cadmium, indium and thallium is used as an active material and gallium hydroxide prepared by subjecting a gallium salt as a starting material to neutralizing treatment in an aqueous solution thereof is contained in an alkaline electrolyte in an amount of 0.005–0.5 wt % based on the zinc alloy.

2. A method according to claim 1, wherein a zinc alloy containing 0.01–0.5 wt % of bismuth is used as a negative electrode active material.

3. A method according to claim 1, wherein a zinc alloy containing 0.01–0.5 wt % of bismuth and totally 0.005–0.2 wt % of at least one element selected from the group consisting of lithium, calcium and aluminum is used as a negative electrode active material.

4. A method according to claim 1, wherein the gallium salt is gallium chloride.

5. A method according to claim 1, wherein the gallium hydroxide is prepared by subjecting gallium nitrate or gallium sulfate as the gallium salt to the neutralizing treatment in an aqueous solution thereof containing chloride ion.

6. A method according to claim 1, wherein the gallium hydroxide contains particles having a particle size of 0.5–8μ in an amount of at least 60 wt % based on the total amount of the gallium hydroxide.

7. A method according to claim 1, wherein the gallium hydroxide shows a weight loss of 8–25 wt % on heat decomposition at up to 900° C.

8. A method of manufacturing a zinc-alkaline battery where a zinc alloy which contains at least one element selected from the group consisting of bismuth, lithium, calcium and aluminum and which is free from mercury, lead, cadmium, indium and thallium is used as an active material and gallium oxide is contained in an alkaline electrolyte in an amount of 0.005–0.5 wt % based on the zinc alloy.

9. A method according to claim 8, wherein a zinc alloy containing 0.01–0.5 wt % of bismuth is used as a negative electrode active material.

10. A method according to claim 8, wherein a zinc alloy containing 0.01–0.5 wt % of bismuth and totally 0.005–0.2 wt % of at least one element selected from the group consisting of lithium, calcium and aluminum is used as a negative electrode active material.

11. A method according to claim 8, wherein the gallium oxide is prepared by heat decomposition of gallium hydroxide prepared by subjecting a gallium salt as a starting material to the neutralizing treatment in an aqueous solution thereof.

12. A method according to claim 8, wherein the gallium oxide contains particles having a particle size of 0.5–8μ in an amount of at least 60 wt % based on the total amount of the gallium hydroxide.

13. A method of manufacturing a zinc-alkaline battery where a zinc alloy which contains at least one element selected from the group consisting of bismuth, lithium, calcium and aluminum and which is free from mercury, lead, cadmium, indium and thallium is used as an active material and gallium hydroxide or gallium oxide in an amount of 0.005-0.5 wt % based on the zinc alloy and a surfactant having a polyethylene oxide group in its hydrophilic group and a perfluoroalkyl group in its oleophilic group in an amount of 0.001-0.1 wt % based on the zinc alloy are contained in an alkaline electrolyte.

14. A method according to claim 13, wherein a zinc alloy containing 0.01-0.5 wt % of bismuth is used as a negative electrode active material.

15. A method according to claim 13, wherein a zinc alloy containing 0.01-0.5 wt % of bismuth and totally 0.005-0.2 wt % of at least one element selected from the group consisting of lithium, calcium and aluminum is used as a negative electrode active material.

16. A method according to claim 13, wherein the gallium hydroxide is prepared by subjecting gallium chloride as a starting material to the neutralizing treatment in an aqueous solution thereof.

17. A method according to claim 13, wherein the gallium hydroxide is prepared by subjecting gallium nitrate or gallium sulfate as a starting material to the neutralizing treatment in an aqueous solution thereof containing chloride ion.

18. A method according to claim 13, wherein the gallium hydroxide or gallium oxide contains particles having a particle size of $0.5$-$8\mu$ in an amount of at least 60 wt % based on the total amount of the gallium hydroxide or gallium oxide.

19. A method according to claim 13, wherein the gallium hydroxide shows a weight loss of 8-25 wt % on heat decomposition at up to 900° C.

20. A method according to claim 13, wherein the gallium oxide is prepared by heat decomposition of gallium hydroxide prepared by subjecting a gallium salt as a starting material to the neutralizing treatment in an aqueous solution thereof.

* * * * *